United States Patent
Bohnert et al.

(10) Patent No.: US 10,793,728 B2
(45) Date of Patent: Oct. 6, 2020

(54) SUPERHYDROPHOBIC COATING AND PROCESS OF MAKING SAME

(71) Applicant: Honeywell Federal Manufacturing & Technologies, LLC, Kansas City, MO (US)

(72) Inventors: George Bohnert, Harrisonville, MO (US); Jamie Messman, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 153 days.

(21) Appl. No.: 16/001,479

(22) Filed: Jun. 6, 2018

(65) Prior Publication Data

US 2019/0016905 A1  Jan. 17, 2019

Related U.S. Application Data

(60) Provisional application No. 62/515,889, filed on Jun. 6, 2017.

(51) Int. Cl.

| | | |
|---|---|---|
| *C08K 3/20* | (2006.01) | |
| *C09D 7/62* | (2018.01) | |
| *C09D 133/14* | (2006.01) | |
| *C09D 7/80* | (2018.01) | |
| *C09C 1/28* | (2006.01) | |
| *C09D 5/00* | (2006.01) | |
| *B05D 5/08* | (2006.01) | |
| *C09D 7/61* | (2018.01) | |
| *C08K 7/26* | (2006.01) | |
| *C08K 3/36* | (2006.01) | |
| *B05D 1/02* | (2006.01) | |

(52) U.S. Cl.
CPC .............. *C09D 7/62* (2018.01); *B05D 5/08* (2013.01); *C09C 1/28* (2013.01); *C09D 5/00* (2013.01); *C09D 7/61* (2018.01); *C09D 7/80* (2018.01); *C09D 133/14* (2013.01); *B05D 1/025* (2013.01); *B05D 2401/00* (2013.01); *C08K 3/20* (2013.01); *C08K 3/36* (2013.01); *C08K 7/26* (2013.01)

(58) Field of Classification Search
CPC ... C09D 7/62; C09D 7/61; C09D 7/80; C09D 167/00; C09D 5/031; C09D 5/1681; C09D 7/1225; B05D 5/08; B05D 1/025; B05D 2401/00; C09C 1/28; C08K 3/20; C08K 3/36; C08K 7/26; C08K 7/24
USPC .......................................... 523/200, 212, 216
See application file for complete search history.

(56) References Cited

U.S. PATENT DOCUMENTS

| | | | |
|---|---|---|---|
| 2008/0245273 A1* | 10/2008 | Vyorkka | ................ C04B 26/02 106/665 |
| 2010/0021745 A1 | 1/2010 | Simpson et al. | |
| 2010/0286582 A1 | 11/2010 | Simpson et al. | |
| 2012/0148470 A1 | 6/2012 | Takeuchi et al. | |
| 2013/0331591 A1 | 12/2013 | Okuno et al. | |
| 2014/0116944 A1 | 5/2014 | Hu et al. | |
| 2014/0155522 A1 | 6/2014 | Simpson et al. | |
| 2014/0237783 A1 | 8/2014 | Madsen | |

FOREIGN PATENT DOCUMENTS

KR    1020140000162    1/2014

OTHER PUBLICATIONS

International Search Report and Written Opinion from PCT/US2018/036297 (dated Jan. 16, 2019).
Nahum, Tehila et al., "The effect of composition and thermodynamics on the surface morphology of durable Buperhyrdophobic polymer coatings," Nanotechnology, Science and Applications, Feb. 15, 2017, vol. 10, pp. 53-68 See. pp. 53-68.
English Abstract of KR 10-2014-0000162; Jan. 2, 2014; Korea Institute of Science and Technology.
International Search Report and Written Opinion for PCT Appln. No. PCT/US2018/036297; Filed Jun. 6, 2018 and all references cited therein.

* cited by examiner

Primary Examiner — Hannah J Pak
(74) Attorney, Agent, or Firm — Hovey Williams LLP

(57) ABSTRACT

An improved superhydrophobic coating and a process of making it is provided herein. More particularly, a robust superhydrophobic coating is produced by using carbon dioxide to enhance the integration of a binder material into the superhydrophobic coating. The carbon dioxide may be used to infiltrate and fill the interstitial voids of a superhydrophobic material, such as diatomaceous earth. Consequently, occupying these voids in the superhydrophobic material effectively blocks other components (e.g., binders) from entering the voids. As a result, the coating formulations of the present invention are more robust and may strongly adhere to the substrates to which they are applied.

20 Claims, 1 Drawing Sheet

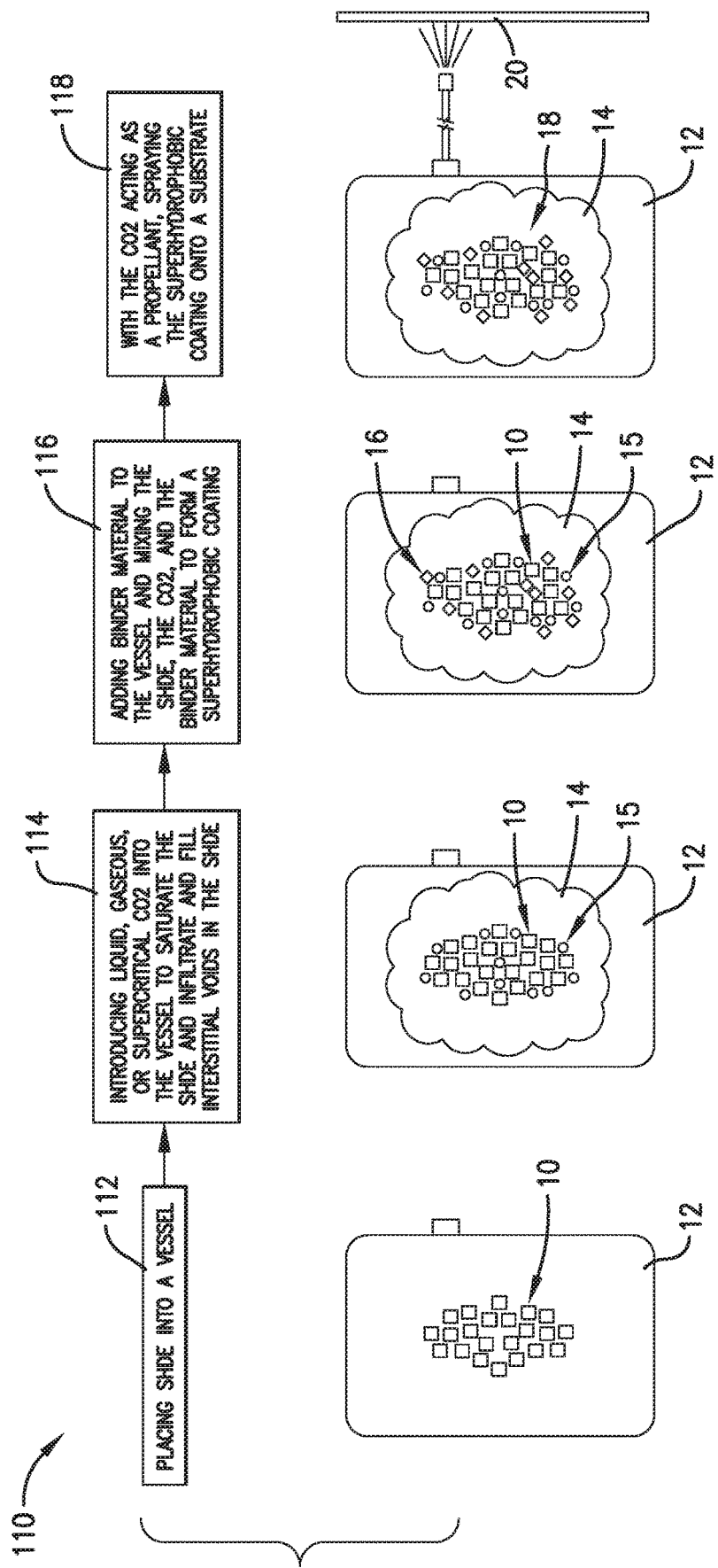

SUPERHYDROPHOBIC COATING AND PROCESS OF MAKING SAME

RELATED APPLICATIONS

This application claims the priority benefit under 35 U.S.C. § 119(e) of U.S. Provisional Patent Application Ser. No. 62/515,889 entitled "SUPERHYDROPHOBIC COATING AND PROCESS OF MAKING SAME," filed Jun. 6, 2017, the entire disclosure of which is incorporated herein by reference.

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND

1. Field of the Invention

The present invention generally relates to superhydrophobic coatings and processes for making them. More particularly, the present invention generally concerns an improved superhydrophobic coating and a process of making it using liquid, gaseous, or supercritical carbon dioxide to enhance the integration of a binder material in the superhydrophobic coating.

2. Description of the Related Art

This background discussion is intended to provide information related to the present invention and is not necessarily prior art.

Superhydrophobic coatings may be used to prevent water and ice from wetting or sticking to the surfaces of materials and to reduce or prevent corrosion and marine bio-fouling. These coatings may be deposited to alter the surface properties of a variety of different materials, such as clothing (cotton), 304 stainless steel, polycarbonate, and glass. Generally, it is desirable to make the coatings more robust so that they adhere more strongly to the substrates, which can be accomplished by adding a binder to the coating formulation. However, current technology only allows for incorporating no more than approximately 5% by weight of the binder into the coating formulation.

SUMMARY

One or more embodiments of the present invention generally concern a process for enhancing integration of a binder material into a hydrophobic coating. The process generally comprises: (a) placing diatomaceous earth into a vessel, (b) introducing carbon dioxide into the vessel to at least partially infiltrate interstitial voids of the diatomaceous earth, (c) adding a binder material to the vessel, and (d) mixing the superhydrophobic diatomaceous earth, the carbon dioxide, and the binder material to form the hydrophobic coating.

One or more embodiments of the present invention may also concern a superhydrophobic coating. Generally, the superhydrophobic coating can comprise: (a) a superhydrophobic diatomaceous earth, (b) carbon dioxide, and (c) at least one binder.

One or more embodiments of the present invention may also concern a process for enhancing integration of a binder material into a superhydrophobic coating. The process generally comprises: (a) placing a superhydrophobic material into a vessel, (b) introducing a void-filling fluid into the vessel to at least partially infiltrate interstitial voids of the superhydrophobic material to thereby form a saturated superhydrophobic material, (c) adding a binder material to the vessel, and (d) mixing the saturated superhydrophobic material and the binder material to form the superhydrophobic coating.

BRIEF DESCRIPTION OF THE FIGURES

Embodiments of the present invention are described herein with reference to the following FIGURE, wherein:

FIG. 1 is a depiction of an embodiment of a process for making a superhydrophobic coating, in which liquid, gaseous, or supercritical carbon dioxide is used to enhance the integration of a binder material in the superhydrophobic coating.

The figures are not intended to limit the present invention to the specific embodiments they depict. Furthermore, the figures are not necessarily to scale.

DETAILED DESCRIPTION

The following detailed description of embodiments of the invention references the accompanying FIGURE. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

Broadly characterized, the present invention provides an improved superhydrophobic coating and a process of making it. More particularly, the present invention provides a more robust superhydrophobic coating and a process of making such a coating using carbon dioxide to enhance the integration of a binder material into the superhydrophobic coating. In more detail, a relatively benign fluid, such as liquid, gaseous, or supercritical carbon dioxide, may be used to infiltrate and fill the interstitial voids, or pores, in a superhydrophobic material, such as diatomaceous earth. Consequently, occupying these voids in the superhydrophobic material effectively blocks other components (e.g., binders, liquids, and other added components) from entering the voids. Without wishing to be bound by theory, it is believed that this blocking action assists in maintaining the superhydrophobic nature of the superhydrophobic material and allows for an increased amount of binder to be incorporated into the coating system. As a result, the coating formulations of the present invention are more robust and may strongly adhere to the substrates to which they are applied.

The Superhydrophobic Materials

The superhydrophobic materials that may be used to form the superhydrophobic coatings of the present invention can include any porous hydrophobic material known in the art. In various embodiments, the superhydrophobic materials that may be used to produce the superhydrophobic coatings of the present invention can include, for example, porous descants, metal foams, porous ceramics, or combinations thereof.

In certain embodiments, the superhydrophobic materials can comprise silicates. In one or more embodiments, the superhydrophobic materials can comprise silicates having a silica to alumina ratio of at least 5:1, 10:1, 15:1, or 20:1.

In one or more embodiments, the superhydrophobic materials comprise a silicate, such as diatomaceous earth. In certain embodiments, the superhydrophobic materials comprise a superhydrophobic diatomaceous earth. Exemplary superhydrophobic diatomaceous earth materials and methods for their preparation are described in U.S. Pat. No. 9,828,521, the entire disclosure of which is incorporated herein by reference in its entirety.

As used herein, the term "hydrophobic" means and includes any material or surface with which water droplets have a contact angle in air of at least 90°, as measured by a contact angle goniometer as described in ASTM D7334-08. Furthermore, as used herein, the term "superhydrophobic" means and includes any material or surface with which water droplets have a contact angle in air of at least 150°, as measured by a contact angle goniometer as described in ASTM D7334-08. Thus, a "superhydrophobic" material will also be considered "hydrophobic;" however, a "hydrophobic" material may not necessarily be "superhydrophobic" in certain embodiments. The maximum possible contact angle that can be achieved between a drop of water and a surface is 180°.

In various embodiments, the superhydrophobic materials can comprise a contact angle in air of at least 110°, 120°, 130°, 140°, 150°, or 160° as measured by a contact angle goniometer as described in ASTM D7334-08. In certain embodiments, the superhydrophobic materials can comprise a contact angle in air that is greater than or equal to 150° as measured by a contact angle goniometer as described in ASTM D7334-08.

In one or more embodiments, the superhydrophobic material can be functionalized with a silane to facilitate subsequent bonding with a binder.

In one or more embodiments, the superhydrophobic material can be in the form of particles. For instance, the superhydrophobic material may be in the form of particles having an average diameter of at least 0.1, 0.2, 0.3, 0.4, 0.5, 1, 2, 3, 4, 5, 6, 7, 8, 9, or 10 microns. Additionally or alternatively, in various embodiments, the superhydrophobic material may be in the form of particles having an average diameter of less than 50, 45, 40, 35, 30, 25, or 20 microns. In certain embodiments, the superhydrophobic material may be in the form of particles having an average diameter of less than 50 microns.

In one or more embodiments, the superhydrophobic material can comprise a pore volume of at least 0.01, 0.05, 0.1, 0.15, 0.2, 0.25, 0.3, 0.35, 0.4, 0.45, or 0.5 cc/g. Additionally or alternatively, the superhydrophobic material can comprise a pore volume of less than 3, 2, 1, 0.9, 0.8, or 0.7 cc/g.

In one or more embodiments, the superhydrophobic material can comprise a hydrophobic coating, which can enhance the hydrophobicity of the hydrophobic material. For example, the superhydrophobic material may have a silica-based coating to enhance the hydrophobicity of the material.

The Process of Producing the Hydrophobic Coatings

The process for producing the coatings of the present invention generally begins by introducing one or more of the above-described superhydrophobic materials and at least one void-filling fluid into a reaction vessel. The superhydrophobic materials may be added to the reaction vessel before, after, or at the same time as the void-filling fluid.

The reaction vessel can include any pressurized vessel known in the art. Additionally, in various embodiments, the reaction vessel comprises a spraying mechanism that allows the vessel to distribute or spray the resulting coating formulation from the vessel.

In various embodiments, the pressure within the vessel may be between slightly above atmospheric pressure (approximately 14.7 psi at sea level) to 1500 psi.

In various embodiments, the temperature within the vessel may be maintained at around room temperature (approximately 23° C.) and up to 200° C.

The above and below referenced reagents (e.g., the superhydrophobic materials, the void-filling fluid, and the binder) may be introduced into the reaction vessel via valves that are connected or may be connected to the vessel. Any vessel transfer mechanism known in the art may be used in conjunction with the reaction vessel. In certain embodiments, the vessel transfer mechanism comprises vacuum transfer.

After being introduced into the reaction vessel, the superhydrophobic materials and the void-filling fluid are allowed to interact for a predetermined amount of time so as to allow the void-filling fluid in the reaction vessel to at least partially saturate the superhydrophobic materials. During this time, the void-filling fluid can at least partially infiltrate and fill the interstitial voids (i.e., pores) in the superhydrophobic materials to thereby form a saturated superhydrophobic material.

The void-filling fluid can comprise any benign solvent or fluid that is capable of saturating and filling the voids in the superhydrophobic materials. Exemplary void-filling fluids include, for example, carbon dioxide and various hydrocarbons (e.g., propane or methane).

In various embodiments, the void-filling fluid can be in the form of a liquid, gas, or a supercritical fluid.

In one or more embodiments, the void-filling fluid comprises liquid, gaseous, or supercritical carbon dioxide. In certain embodiments, the void-filling fluid comprises supercritical carbon dioxide.

Next, at least one binder may be added to the reaction vessel and mixed with the superhydrophobic material and the void-filling fluid to form the superhydrophobic coating formulation. The binder may comprise, for example, any suitable material or combination of materials that may adhere the resulting coating formulation to the desired substrate. Exemplary binders include, for example, epoxies, urethanes, elastomers, furan cement, acrylate adhesives, cyanoacrylate adhesives, phenolic adhesives, polyvinyl alcohol/polyvinyl acetate adhesives, and/or inorganic binders/cements.

Although the above exemplary embodiment states that the binder is added to the reaction vessel after the superhydrophobic material and the void-filling fluid, alternative embodiments would allow the binder to be added to the reaction vessel before or at the same time as the superhydrophobic material and/or the void-filling fluid.

The binder is capable of being blended with the superhydrophobic material and the void-filling fluid (or the saturated superhydrophobic material if the void-filling fluid has been allowed to saturate the superhydrophobic material before the introduction of the binder into the reaction vessel) without completely filling the pores of the superhydrophobic material due to the void-filling fluid. Without wishing to be bound by theory, the void-filling fluid in the voids of the superhydrophobic material can repel the binder to thereby preserve a volume of void-filling fluid within the voids of the superhydrophobic material. Consequently, the resulting coating formulation can comprise more binder relative to present hydrophobic coatings.

In various embodiments, the resulting superhydrophobic coatings can comprise at least 1, 5, 6, 7, 8, 9, 10, 11, 12, 13, 14, 15, 16, 17, 18, 19, or 20 weight percent of at least one binder based on the total weight of the superhydrophobic coating. Additionally or alternatively, the resulting superhydrophobic coatings can comprise less than 40, 35, 30, 25, or 20 weight percent of at least one binder based on the total weight of the superhydrophobic coating.

In various embodiments, the resulting superhydrophobic coatings can comprise at least 10, 15, 20, 25, 30, 35, 40, 45, 50, 55, 60, 65, 70, 75, or 80 weight percent of at least one superhydrophobic material based on the total weight of the superhydrophobic coating. Additionally or alternatively, the resulting superhydrophobic coatings can comprise less than 99, 95, 90, 85, or 80 weight percent of at least one superhydrophobic material based on the total weight of the superhydrophobic coating.

Additional components, such as pigments, propellants, and/or surfactants, may be added as needed or desired to the reaction vessel for enhancement and/or integration into the superhydrophobic coating. These additional components may be added in conjunction with or after the superhydrophobic material, the void-filling fluid, and/or the binder.

In various embodiments, a portion of the void-filling fluid may fail to saturate and fill the voids of the superhydrophobic material and, therefore, residual void-filling fluid may be present in the reaction vessel. In embodiments where the void-filling fluid comprises carbon dioxide, the residual carbon dioxide can act as a propellant in the reaction vessel, especially when the reaction vessel comprises a spraying mechanism. Thus, the residual carbon dioxide may be used to deliver the formed coating formulation from the reaction vessel via the spraying mechanism onto the desired substrate.

In various embodiments, the superhydrophobic coatings can comprise a contact angle in air of at least 110°, 120°, 130°, 140°, 150°, or 160° as measured by a contact angle goniometer as described in ASTM D7334-08. Thus, the superhydrophobic coatings can protect the coated substrate from wetting and other moisture damage.

The superhydrophobic coatings of the present invention can be employed as coatings for various surfaces and substrates. Exemplary substrates that the coatings may be applied to include, for example, cotton, stainless steel, polycarbonate, polyester, polyolefins, hemp, textiles, and glass.

FIG. 1 depicts an exemplary embodiment of a process 110 for enhancing the integration of a binder material in a superhydrophobic coating. As shown in FIG. 1, a superhydrophobic diatomaceous earth ("SHDE") 10, or another suitable superhydrophobic material, may be placed in a reaction vessel 12, as shown in 112. Supercritical carbon dioxide 14, or another suitable void-filling fluid, may be introduced into the vessel 12 using typical valve transfer processes to saturate the SHDE 10, as shown in 114. A portion of the carbon dioxide 15 may infiltrate and fill interstitial voids in the SHDE 10, while the remainder of the carbon dioxide 14 may remain unbound or otherwise free. A binder material 16 may be added to the vessel 12 and mixed with the SHDE 10 and the carbon dioxide 15 using similar valve transfer processes to produce the superhydrophobic coating 18, as shown in 116. The ability of the portion of the carbon dioxide 15 to infiltrate and fill the interstitial voids in the SHDE 10 may allow for an increased amount of binder to be present in the resulting coating formulation. For example, the introduction of the supercritical carbon dioxide 15 may allow for using up to 20% by weight of binder 16 in the coating formulations. With the remainder of the carbon dioxide 14 acting as a propellant, the superhydrophobic coating formulation 18 may then be sprayed from the vessel 12 onto a substrate 20 to coat the substrate 20 as desired, as shown in 118.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Supercritical carbon dioxide (100 g), a binder (i.e., an ethyl-2-cyanoacrylate adhesive) (1 g), and SHDE (5 g) were combined in a pressurized 300 ml Whitey bottle. The binder was added after the carbon dioxide and SHDE were initially introduced into the bottle. The materials were allowed to mix and were subsequently sprayed onto several substrates (i.e., a glass bottle, polycarbonate lenses, 304 stainless steel, and cotton fabric) by opening the valve of the bottle and delivering the coating composition through an ⅛ inch nozzle. The wetting properties of the applied coatings were then tested with tap water. The wetting tests demonstrated that water did not stick or wet the surfaces with the applied coatings and resulted in the water forming very large contact angles, while the uncoated surfaces wetted.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

In this description, references to "one embodiment," "an embodiment," or "embodiments" mean that the feature or features referred to are included in at least one embodiment of the invention. Separate references to "one embodiment,"

"an embodiment," or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims Not Limited to Disclosed Embodiments

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process of forming a hydrophobic coating, the process comprising:
    placing diatomaceous earth into a vessel;
    introducing carbon dioxide into the vessel to at least partially infiltrate interstitial voids of the diatomaceous earth;
    adding a binder material to the vessel; and
    mixing the diatomaceous earth, the carbon dioxide, and the binder material to form a hydrophobic coating.

2. The process of claim 1, wherein the hydrophobic coating comprises 5 to 20 weight percent of the binder material based on the total weight of the hydrophobic coating.

3. The process of claim 1, wherein the carbon dioxide comprises supercritical carbon dioxide.

4. The process of claim 1, wherein the diatomaceous earth comprises a superhydrophobic diatomaceous earth.

5. A process of forming a superhydrophobic coating, the process comprising:
    placing a superhydrophobic material into a vessel;
    introducing a void-filing fluid comprising carbon dioxide or a hydrocarbon into the vessel to at least partially infiltrate interstitial voids of the superhydrophobic material to thereby form a saturated superhydrophobic material;
    adding a binder material to the vessel; and
    mixing the saturated superhydrophobic material and the binder material to form a superhydrophobic coating.

6. The process of claim 5, wherein the superhydrophobic material comprises a superhydrophobic diatomaceous earth.

7. The process of claim 5, wherein the void-filing fluid comprises carbon dioxide.

8. The process of claim 5, wherein the void-filing fluid comprises a hydrocarbon.

9. The process of claim 5, wherein the carbon dioxide is a supercritical carbon dioxide.

10. The process of claim 5, wherein the superhydrophobic coating comprises at least 10 weight percent of the binder material based on the total weight of the superhydrophobic coating.

11. The process of claim 10, wherein the superhydrophobic coating comprises at least 60 weight percent of the superhydrophobic material based on the total weight of the superhydrophobic coating.

12. A process of forming a superhydrophobic coating on a substrate, the process comprising:
    placing a superhydrophobic material into a vessel;
    introducing a void-filing fluid comprising carbon dioxide or a hydrocarbon into the vessel to at least partially infiltrate interstitial voids of the superhydrophobic material to thereby form a saturated superhydrophobic material;
    adding a binder material to the vessel;
    mixing the saturated superhydrophobic material, the void-filing fluid, and the binder material to form a superhydrophobic coating; and
    applying the superhydrophobic coating onto a substrate.

13. The process of claim 12, wherein the superhydrophobic material comprises a superhydrophobic diatomaceous earth.

14. The process of claim 12, wherein the void-filing fluid comprises carbon dioxide.

15. The process of claim 12, wherein the void-filing fluid comprises a hydrocarbon.

16. The process of claim 12, wherein the carbon dioxide is a supercritical carbon dioxide.

17. The process of claim 12, wherein the applying comprises spraying the superhydrophobic coating on the substrate, wherein residual void-filing fluid in the vessel is used as a propellant for the spraying.

18. The process of claim 12, wherein the superhydrophobic coating comprises 5 to 20 weight percent of the binder material based on the total weight of the superhydrophobic coating.

19. The process of claim 12, wherein the superhydrophobic coating comprises at least 10 weight percent of the binder material based on the total weight of the superhydrophobic coating.

20. The process of claim 12, wherein the superhydrophobic coating comprises at least 60 weight percent of the superhydrophobic material based on the total weight of the superhydrophobic coating.

* * * * *